United States Patent
Yamauchi (10) Patent No.: US 7,270,621 B2
(45) Date of Patent: Sep. 18, 2007

(54) MOVING BODY AND CONTROL METHOD OF MOVING BODY

(75) Inventor: Tomokazu Yamauchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 184 days.

(21) Appl. No.: 11/268,517

(22) Filed: Nov. 8, 2005

(65) Prior Publication Data

US 2006/0100056 A1    May 11, 2006

(30) Foreign Application Priority Data

Nov. 8, 2004    (JP) .............................. 2004-323959

(51) Int. Cl.
*B60K 1/02*    (2006.01)
(52) U.S. Cl. ........................................................ 477/3
(58) Field of Classification Search ................... 477/3; 180/65.7, 65.8
See application file for complete search history.

(56) References Cited

U.S. PATENT DOCUMENTS 6,931,318 B2    8/2005    Kaita et al.
7,131,510 B2 *  11/2006   Mesiti et al. ............... 180/65.2

FOREIGN PATENT DOCUMENTS

| JP | 2000-263213 | 9/2000 |
| JP | 2000-204997 | 7/2002 |

* cited by examiner

*Primary Examiner*—Dirk Wright
(74) *Attorney, Agent, or Firm*—Kenyon & Kenyon LLP (57) ABSTRACT

In response to a start request of an engine in setting of a gearshift position SP to a drive (D) position, the control procedure sets a relatively small value N1 to a threshold value Nref (step S120) and starts fuel injection and ignition of the engine when a rotation speed Ne of the engine reaches or exceeds the threshold value Nref (=N1) (steps S160 to S180). This ensures a quick start of the engine. In response to a start request of the engine in setting of the gearshift position SP to a parking (P) position, on the other hand, the control procedure sets a greater value N2 than the value N1 to the threshold value Nref (step S140) and starts fuel injection and ignition of the engine when the rotation speed Ne of the engine reaches or exceeds the threshold value Nref (=N2) (steps S160 to S180). This effectively reduces potential vibrations at a start of the engine.

11 Claims, 8 Drawing Sheets

MOVING BODY AND CONTROL METHOD OF MOVING BODY

BACKGROUND OF THE INVENTION

1. Field of the Invention

The present invention relates to a moving body and a control method of the moving body.

2. Description of the Prior Art

One proposed moving body is a motor vehicle driven with output powers of an engine and a motor (see, for example, Japanese Patent Laid-Open Gazette No. 2000-204997). When a start request of the engine is given during a drive of the motor vehicle with only the output power of the motor, the motor vehicle sets a start rotation speed of the engine according to a driving force demand and starts fuel injection control and ignition control when the engine is cranked by the motor to have the rotation speed reach the start rotation speed.

SUMMARY OF THE INVENTION

The proposed technique regards the control operations to start the engine only during a drive of the motor vehicle, that is, when a gearshift position of a gearshift lever is a drive position for driving the motor vehicle. This prior art technique, however, does not mention the control operations to start the engine when the gearshift position is other than the drive position. Setting the same start rotation speed in the gearshift position other than the drive position makes the driver feel undesirable vibrations at the start of the engine during the stop of the motor vehicle.

The moving body of the invention and the control method of the moving body thus aim to reduce potential vibrations at a start of an internal combustion engine. The moving body of the invention and the control method of the moving body also aim to ensure an adequate start of the internal combustion engine. The moving body of the invention and the control method of the moving body further aim to reduce power consumption as electric power consumed by motoring the internal combustion engine in a gearshift position set to a moving position for moving the moving body.

In order to attain at least part of the above and the other related objects, the moving body of the invention and the control method of the moving body have the configurations discussed below.

The present invention is directed to a moving body which includes: an internal combustion engine that outputs power used for moving the moving body; a motoring structure that motors the internal combustion engine; a motor that outputs power used for moving the moving body; an accumulator unit that transmits electric power to and from the motoring structure and the motor; a gearshift position detection unit that detects a gearshift position of a gearshift lever: a rotation speed measurement unit that measures a rotation speed of the internal combustion engine; and a start control module that, in response to a start request of the internal combustion engine in the detected gearshift position set to a moving position for moving the moving body, controls the motoring structure to motor the internal combustion engine and controls the internal combustion engine to start fuel injection and ignition of the internal combustion engine when the measured rotation speed of the internal combustion engine reaches a preset first rotation speed, in response to a start request of the internal combustion engine in the detected gearshift position other than the moving position, the start control module controlling the motoring structure to motor the internal combustion engine and controlling the internal combustion engine to start fuel injection and ignition of the internal combustion engine when the measured rotation speed of the internal combustion engine reaches a preset second rotation speed, which is higher than the preset first rotation speed.

In response to a start request of the internal combustion engine in the detected gearshift position set to the moving position for moving the moving body, the moving body controls the motoring structure to motor the internal combustion engine and controls the internal combustion engine to start fuel injection and ignition of the internal combustion engine when the measured rotation speed of the internal combustion engine reaches the preset first rotation speed. In response to a start request of the internal combustion engine in the detected gearshift position other than the moving position, on the other hand, the moving body controls the motoring structure to motor the internal combustion engine and controls the internal combustion engine to start fuel injection and ignition of the internal combustion engine when the measured rotation speed of the internal combustion engine reaches the preset second rotation speed, which is higher than the preset first rotation speed. When the start request of the internal combustion engine is given under the gearshift position set to the moving position, fuel injection and ignition of the internal combustion engine are initiated when the internal combustion engine is motored to have the rotation speed reach the relatively low first rotation speed. This ensures a quick start of the internal combustion engine. When the start request of the internal combustion engine is given under the gearshift position other than the moving position, on the other hand, fuel injection and ignition of the internal combustion engine are initiated when the internal combustion engine is motored to have the rotation speed reach the relatively high second rotation speed. This effectively reduces potential vibrations at a start of the internal combustion engine. The start control of the invention thus enables an adequate start of the internal combustion engine according to the gearshift position. The moving body may be, for example, any of motor vehicles, railway vehicles, ships and boats, and aircraft.

In one preferable embodiment of the moving body of the invention, the start control module controls the motoring structure in the detected gearshift position set to the moving position to sequentially output a preset first torque before fulfillment of a predetermined condition and a preset second torque, which is lower than the preset first torque, after fulfillment of the predetermined condition. The start control module controls the motoring structure in the detected gearshift position other than the moving position to output a preset third torque, which is higher than the preset second torque. When the detected gearshift position is the moving position, this start control quickly raises the internal combustion engine before fulfillment of the predetermined condition and limits the power consumption for motoring the internal combustion engine after fulfillment of the predetermined condition. When the detected gearshift position is not the moving position, on the other hand, this start control quickly raises the internal combustion engine. The predetermined condition adopted by the start control module may be elapse of a preset time since a start of motoring the internal combustion engine.

In another preferable embodiment of the invention, the moving body further has a motoring power consumption estimation module that estimates a motoring power consumption as electric power consumed by motoring the internal combustion engine. In response to the start request of the internal combustion engine in the detected gearshift position set to the moving position, the start control module controls the motoring structure to motor the internal combustion engine in a range of the estimated motoring power consumption that does not exceed a preset reference power level. This arrangement effectively limits the power consumption for motoring the internal combustion engine when the gearshift position is the moving position. The motoring power consumption estimation module may estimate the motoring power consumption, based on the measured rotation speed of the internal combustion engine and an output torque of the motoring structure.

Instill another preferable embodiment of the moving body of the invention, the motoring structure includes an electric power-mechanical power input output mechanism that is linked to an output shaft of the internal combustion engine and to a drive shaft driven for moving the moving body and outputs part of power, which is input from or output to the output shaft of the internal combustion engine, to the drive shaft through input and output of mechanical power and electric power, and the motoring structure may motor the internal combustion engine with output of a canceling power to cancel out the output power to the drive shaft by the electric power-mechanical power input output mechanism. In this embodiment, the motor may be connected to output power to the drive shaft, and the motoring structure may motor the internal combustion engine with output of the canceling power from the motor. The electric power-mechanical power input output mechanism may include: a three shaft-type power input output module that is linked to three shafts, the output shaft of the internal combustion engine, the drive shaft, and a third rotating shaft, and inputs and outputs power from and to a residual one shaft, based on powers input from and output to any two shafts among the three shafts; and a motor for the rotating shaft that is capable of inputting and outputting power from and to the third rotating shaft. Further, the electric power-mechanical power input output mechanism may include: a pair-rotor motor that has a first rotor connected to the output shaft of the internal combustion engine and a second rotor connected to the drive shaft and outputs at least part of the power from the internal combustion engine to the drive shaft with input and output of electric power through electromagnetic interactions of the first rotor and the second rotor.

The present invention is directed to a control method of a moving body including: an internal combustion engine that outputs power used for moving the moving body; a motoring structure that motors the internal combustion engine; a motor that outputs power used for moving the moving body; and an accumulator unit that transmits electric power to and from the motoring structure and the motor, and the control method including the steps of: (a) in response to a start request of the internal combustion engine in a detected gearshift position of a gearshift lever set to a moving position for moving the moving body, controlling the motoring structure to motor the internal combustion engine and controlling the internal combustion engine to start fuel injection and ignition of the internal combustion engine when an observed rotation speed of the internal combustion engine reaches a preset first rotation speed; and (b) in response to a start request of the internal combustion engine in the detected gearshift position other than the moving position, controlling the motoring structure to motor the internal combustion engine and controlling the internal combustion engine to start fuel injection and ignition of the internal combustion engine when the observed rotation speed of the internal combustion engine reaches a preset second rotation speed, which is higher than the preset first rotation speed.

In response to a start request of the internal combustion engine in the detected gearshift position set to the moving position for moving the moving body, the control method of the moving body controls the motoring structure to motor the internal combustion engine and controls the internal combustion engine to start fuel injection and ignition of the internal combustion engine when the measured rotation speed of the internal combustion engine reaches the preset first rotation speed. In response to a start request of the internal combustion engine in the detected gearshift position other than the moving position, on the other hand, the controle method of the moving body controls the motoring structure to motor the internal combustion engine and controls the internal combustion engine to start fuel injection and ignition of the internal combustion engine when the measured rotation speed of the internal combustion engine reaches the preset second rotation speed, which is higher than the preset first rotation speed. When the start request of the internal combustion engine is given under the gearshift position set to the moving position, fuel injection and ignition of the internal combustion engine are initiated when the internal combustion engine is motored to have the rotation speed reach the relatively low first rotation speed. This ensures a quick start of the internal combustion engine. When the start request of the internal combustion engine is given under the gearshift position other than the moving position, on the other hand, fuel injection and ignition of the internal combustion engine are initiated when the internal combustion engine is motored to have the rotation speed reach the relatively high second rotation speed. This effectively reduces potential vibrations at a start of the internal combustion engine. The start control of the invention thus enables an adequate start of the internal combustion engine according to the gearshift position.

In the control method of the moving body of the invention, the step (a) may control the motoring structure to motor the internal combustion engine with a preset first torque before fulfillment of a predetermined condition and with a preset second torque, which is lower than the preset first torque, after fulfillment of the predetermined condition, and the step (b) may control the motoring structure to motor the internal combustion engine with a preset third torque, which is higher than the preset second torque.

DESCRIPTION OF THE PREFERRED EMBODIMENTS

Figure 1:
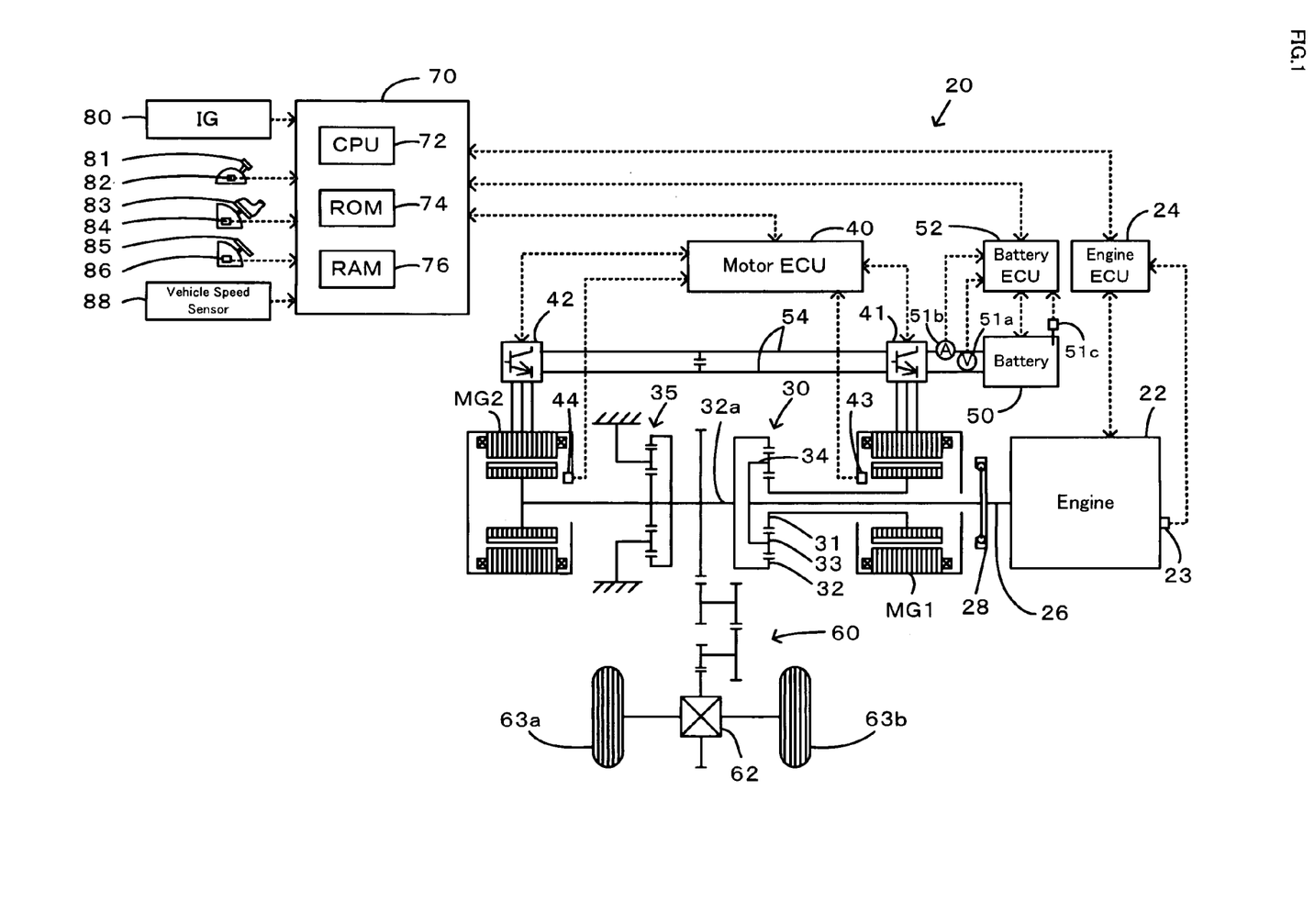
FIG. 1 schematically illustrates the configuration of a hybrid vehicle in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor 51b attached to the power line 54 connected with the output terminal of the battery 50, and a battery temperature measured by a temperature sensor 51c attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The gearshift lever 81 is operable to one of available gear positions, for example, a drive position (D position) for general forward drive, a reverse position (R position) for reverse drive, a parking position (P position) for parking, and a neutral position (N position). The hybrid electronic control unit 70 is connected to the engine ECU 24, the motor ECU 40, and the battery ECU 52 via respective communication ports to transmit diversity of control signals and data to and from the engine ECU 24, the motor ECU 40, and the battery ECU 52. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
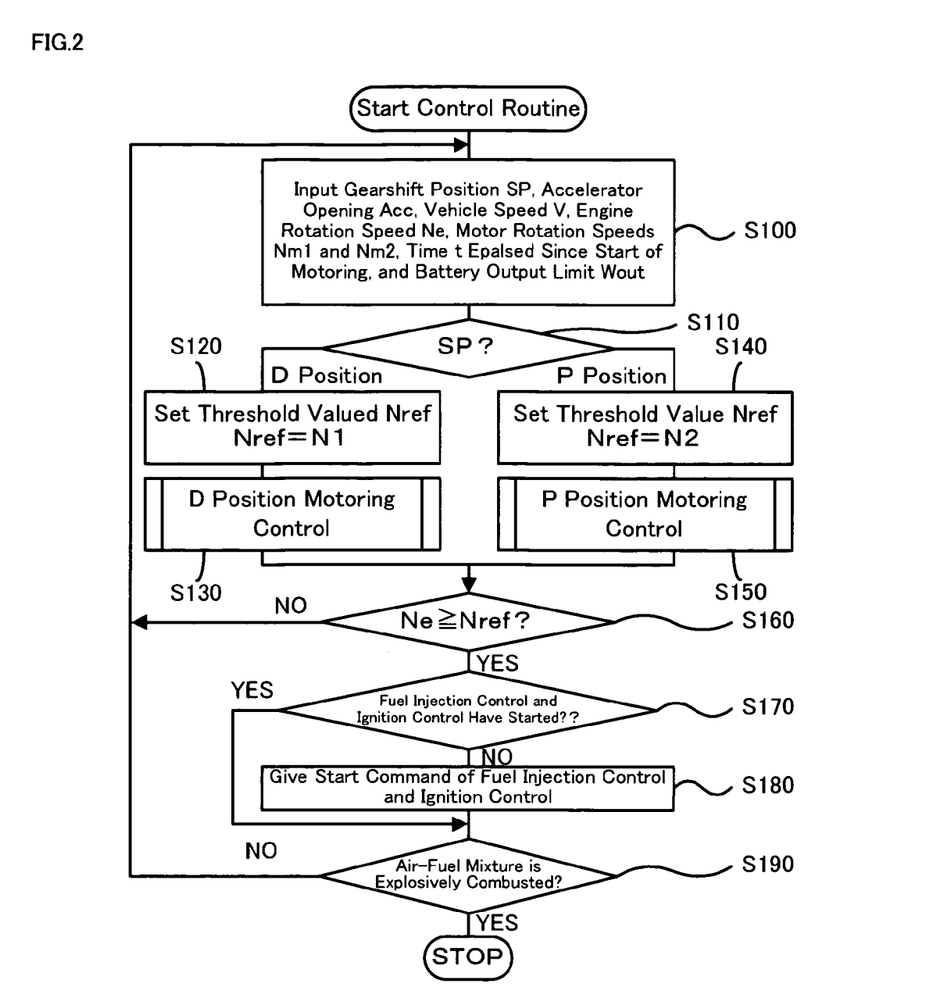
FIG. 2 is a flowchart showing a start control routine executed by a hybrid electronic control unit included in the hybrid vehicle of FIG. 1.

The description regards the operations of the hybrid vehicle 20 of the embodiment constructed as discussed above, especially a series of control at a start of the engine 22. FIG. 2 is a flowchart showing a start control routine executed by the hybrid electronic control unit 70 mounted on the hybrid vehicle 20 of the embodiment. This start control routine is triggered by a start request of the engine 22.

In the start control routine, the CPU 72 of the hybrid electronic control unit 70 first inputs various data required for control, that is, the gearshift position SP from the gearshift position sensor 82, the accelerator opening Acc from the accelerator pedal position sensor 84, the vehicle speed V from the vehicle speed sensor 88, a rotation speed Ne of the engine 22, rotation speeds Nm1 and Nm2 of the motors MG1 and MG2, a time t elapsed since a start of motoring the engine 22, and an output limit Wout of the battery 50 (step S100). The rotation speed Ne of the engine 22 is computed from the crank angle measured by the crank position sensor 23 attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The time t elapsed since the start of motoring the engine 22 is a count of a timer that starts counting in response to the start request of the engine 22. The output limit Wout of the battery 50 is set corresponding to the temperature Tb of the battery 50 measured by the temperature sensor 51c and the state of charge (SOC) of the battery 50 and is received from the battery ECU 52 by communication.

After the data input, the CPU 72 identifies the input gearshift position SP (step S110). When the input gearshift position SP is the D position, the CPU 72 sets a value N1 to a threshold value Nref as a reference rotation speed for starting fuel injection control and ignition control of the engine 22 (step S120) and executes D-position motoring control (step S130). The details of the D-position motoring control are described later with reference to the flowchart of FIG. 3. When the input gearshift position SP is the P position, on the other hand, the CPU 72 sets a value N2, which is greater than the value N1, to the threshold value Nref (step S140) and executes P-position motoring control (step S150) The details of the P-position motoring control are described later with reference to the flowchart of FIG. 4. The value N1 depends upon the performances of the engine 22 and the vehicle and is set, for example, equal to or higher than an upper limit rotation speed of a resonance rotation speed range where the rotation of the engine 22 causes resonance of the vehicle and the equipment mounted on the vehicle. The value N2 also depends upon the performances of the engine 22 and the vehicle and is set to a level that does not make the driver feel vibrations at a start of the engine 22 during a stop of the vehicle.

After setting the threshold value Nref at either step S120 or step S140, the CPU 72 compares the current rotation speed Ne of the engine 22 with the preset threshold value Nref (step S160). When the rotation speed Ne of the engine 22 is lower than the threshold value Nref, the start control routine returns to step S100. In the course of repeated execution of the processing flow of steps S100 to S160, the rotation speed Ne of the engine 22 rises to or above the threshold value Nref to give an affirmative answer at step S160. The CPU 72 then determines whether fuel injection control and ignition control of the engine 22 have already started (step S170) and gives a command to start the fuel injection control and the ignition control (step S180) when not started yet. The engine ECU 24 accordingly starts the fuel injection control and the ignition control. The start control routine returns to step S100 unless explosive combustion of the air-fuel mixture in the engine 22 is detected (step S190). The start control routine is terminated by detection of the explosive combustion. When the start request of the engine 22 is given in the D position as the gearshift position SP of the gearshift lever 81, the relatively small value N1 is set to the threshold value Nref. Fuel injection and ignition of the engine 22 start when the engine 22 is motored to raise its rotation speed Ne to or above the preset threshold value Nref (=N1) This ensures a quick start of the engine 22. When the start request of the engine 22 is given in the P position as the gearshift position SP, on the other hand, the greater value N2 than the relatively small value N1 is set to the threshold value Nref. Fuel injection and ignition of the engine 22 start when the engine 22 is motored to raise its rotation speed Ne to or above the preset threshold value Nref (=N2). This effectively reduces potential vibrations at a start of the engine 22. The start control of this embodiment thus ensures an adequate start of the engine 22 according to the gearshift position SP.

Figure 5:
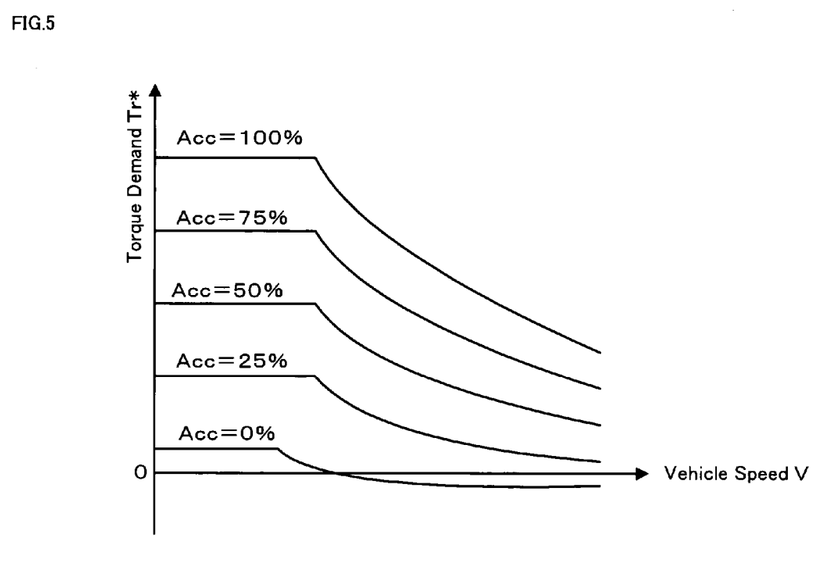
FIG. 5 shows one example of a torque demand setting map.

The details of the D-position motoring control triggered at step S130 in the flowchart of FIG. 2 are described with reference to the flowchart of FIG. 3. In the D-position motoring control process, the CPU 72 of the hybrid electronic control unit 70 first sets a torque demand Tr* to be output to the ring gear shaft 32a or the drive shaft, based on the input accelerator opening Acc and the input vehicle speed V (step S200). The concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from the torque demand setting map. One example of the torque demand setting map is shown in FIG. 5.

Figure 6:
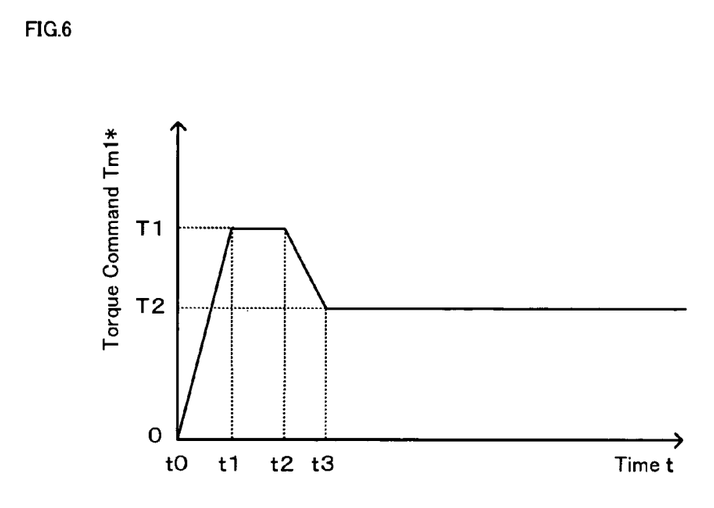
FIG. 6 shows one example of a torque command setting map used in the D-position motoring control.

A torque command Tm1* of the motor MG1 is set corresponding to the input time t elapsed since the start of motoring the engine 22 (step S210). The concrete procedure of setting the torque command Tm1* of the motor MG1 in this embodiment stores in advance a variation in torque command Tm1* against the time t elapsed since the start of motoring as a torque command setting map in the ROM 74 and reads the torque command Tm1* corresponding to the given elapsed time t from the torque command setting map. One example of the torque command setting map is shown in FIG. 6. As shown in the map of FIG. 6, the torque command Tm1* of the motor MG1 gradually increases immediately after a time point t0 (t=0) when a start request of the engine 22 is given, and reaches a preset relatively high torque T1 at a time point t1. The torque command Tm1* then gradually decreases after a time point t2, which is a preset reference time tref elapsed since the time point t1, and reaches a preset lower torque T2 at a time point t3. The torque T1 and the reference time tref are respectively set to adequate values to attain a quick rise of the rotation speed Ne of the engine 22, and depend upon the performances of the engine 22 and the battery 50. The torque T2 is set to an adequate value to limit an increase of motoring power consumption Pm (described below) simultaneously with a further rise of the rotation speed Ne of the engine 22, and depend upon the performances of the engine 22 and the battery 50.

The motoring power consumption Pm consumed by motoring the engine 22 is calculated from the set torque command Tm1* of the motor MG1, the input rotation speed Ne of the engine 22, and the gear ratio ρ of the power distribution integration mechanism 30 according to Equation (1) given below (step S220):

$$Pm = Tm1^* \cdot Ne \cdot (1+\rho)/\rho \qquad (1)$$

Figure 7:
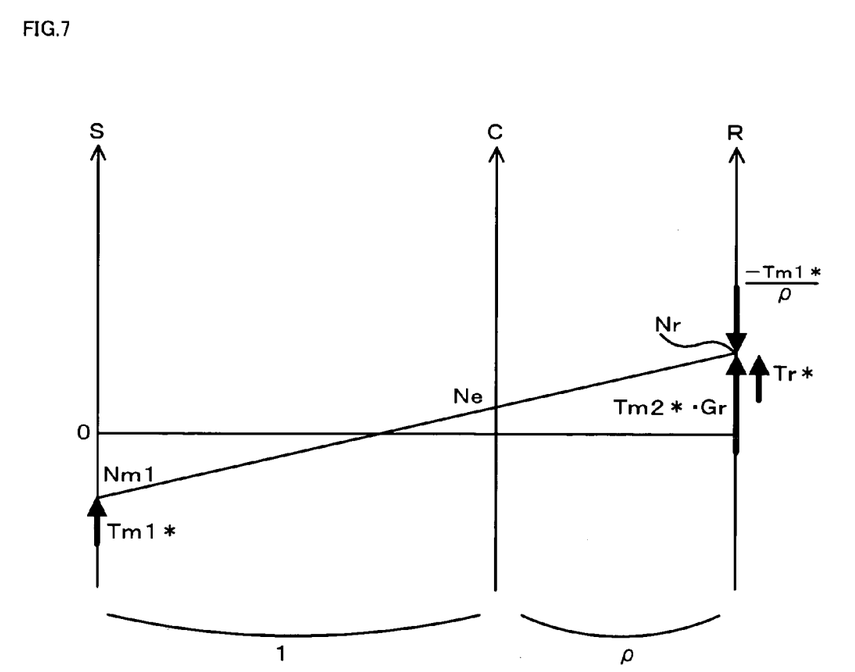
FIG. 7 is an alignment chart showing torque-rotation speed dynamics of respective rotational elements of a power distribution integration mechanism included in the hybrid vehicle of FIG. 1 at a start of an engine.

FIG. 7 is an alignment chart showing torque-rotation speed dynamics of the respective rotational elements included in the power distribution integration mechanism 30 at a start of the engine 22. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 that is equivalent to division of the rotation speed Nm2 of the motor MG2 by the gear ratio Gr of the reduction gear 35. Equation (1) is led from the alignment chart of FIG. 7. The motoring power consumption Pm is thus obtained by converting the torque command Tm1* of the motor MG1 into a torque applied to the carrier 34 (Tm1*·(1+ρ)/ρ) and multiplying the converted torque by the rotation speed Ne of the engine 22.

The calculated motoring power consumption Pm is compared with a preset reference power level P1 (step S230). When the calculated motoring power consumption Pm is higher than the preset reference power level P1, the torque command Tm1* of the motor MG1 is recalculated from the preset reference power level P1, the rotation speed Ne of the engine 22, and the gear ratio ρ of the power distribution integration mechanism 30 according to Equation (2) given below (step S240):

$$Tm1^* = P1 \cdot \rho/Ne/(1+\rho) \qquad (2)$$

The reference power level P1 is set as a threshold value to judge the possibility of failure in adequate supply of driving electric power from the battery 50 to the motor MG2 and depends upon the performance of the battery 50. The processing of steps S210 to S240 sets the torque command Tm1* of the motor MG1 in the range of the motoring power consumption Pm that does not exceed the preset reference power level P1. Such setting reduces electric power consumed by motoring the engine 22 and thereby ensures an adequate supply of driving electric power to the motor MG1.

An upper torque restriction Tmax is then calculated as a maximum possible torque output from the motor MG2 according to Equation (3) given below (step S250). The calculation subtracts the product of the torque command Tm1* and the current rotation speed Nm1 of the motor MG1, which represents the power consumption (power generation) of the motor MG1, from the output limit Wout of the battery 50 and divides the difference by the current rotation speed Nm2 of the motor MG2:

$$Tmax = (Wout - Tm1^* \cdot Nm1)/Nm2 \qquad (3)$$

A tentative motor torque Tm2tmp is calculated, as a torque to be output from the motor MG2, from the torque demand Tr*, the torque command Tm1* of the motor MG1, the gear ratio ρ of the power distribution integration mechanism 30, and the gear ratio Gr of the reduction gear 35 according to Equation (4) given below:

$$Tm2tmp = (Tr^* + Tm1^*/\rho)/Gr \qquad (4)$$

The smaller between the calculated upper torque restriction Tmax and the calculated tentative motor torque Tm2tmp is set to a torque command Tm2* of the motor MG2 (step S270). Such setting of the torque command Tm2* of the motor MG2 enables a canceling torque to be output from the motor MG2 and cancel out a reactive torque applied to the ring gear shaft 32a or the drive shaft in the process of motoring the engine 22 with the motor MG1. The setting also restricts the torque demand Tr* to be output to the ring gear shaft 32a in the range of the output limit Wout of the battery 50. Equation (4) is readily led from the alignment chart of FIG. 7.

The CPU 72 sends the set torque commands Tm1* and Tm2* of the motors MG1 and MG2 to the motor ECU 40 (step S280) and terminates the D-position motoring control process. The motor ECU 40 receives the torque commands Tm1* and Tm2* of the motors MG1 and MG21 and executes switching control of the switching elements included in the respective inverters 41 and 42 to drive the motor MG1 with the torque command Tm1* and the motor MG2 with the torque command Tm2*.

Figure 4:
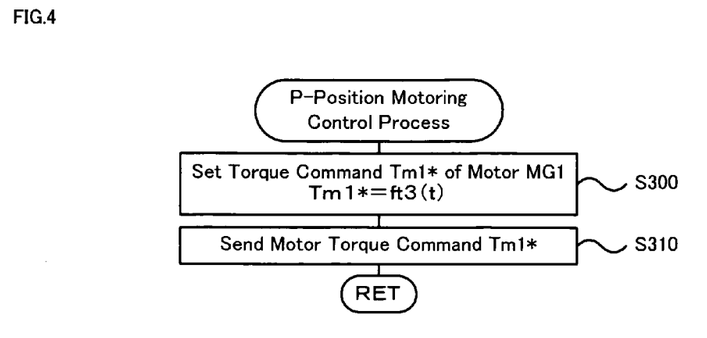
FIG. 4 is a flowchart showing the details of P-position motoring control executed at step S150 in the start control routine of FIG. 2.
Figure 8:
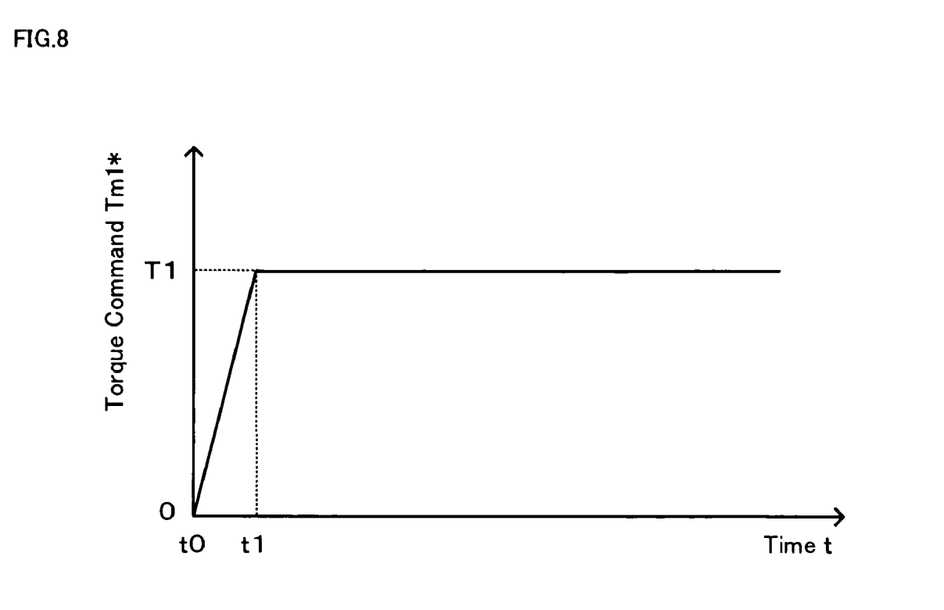
FIG. 8 shows one example of the torque command setting map used in the P-position motoring control.

The details of the P-position motoring control triggered at step S150 in the flowchart of FIG. 2 are described with reference to the flowchart of FIG. 4. In the P-position motoring control process, the CPU 72 of the hybrid electronic control unit 70 sets the torque command Tm1* of the motor MG1, based on the time t elapsed since the start of motoring (step S300) and sends the set torque command Tm1* of the motor MG1 to the motor ECU 40 (step S310). The CPU 72 then terminates the P-position motoring control process. The concrete procedure of this embodiment sets the torque command Tm1* of the motor MG1 corresponding to the time t elapsed since the start of motoring from a torque command setting map shown in FIG. 8. The torque command Tm1* of the motor MG1 gradually increases immediately after a time point t0, when a start request of the engine 22 is given, and reaches a preset relatively high torque T1 at a time point t1. Motoring the engine 22 with this torque variation attains a quick increase of the rotation speed Ne of the engine 22. In the hybrid vehicle 20 of the embodiment, in response to setting of the gearshift position SP to the P position, a parking lock mechanism (not shown) is activated to lock the ring gear shaft 32a or the drive shaft. The P-position motoring control process thus does not require output of the canceling torque from the motor MG2 to cancel out the reactive torque applied to the ring gear shaft 32a in the process of motoring the engine 22 with the motor MG1.

Figure 9:
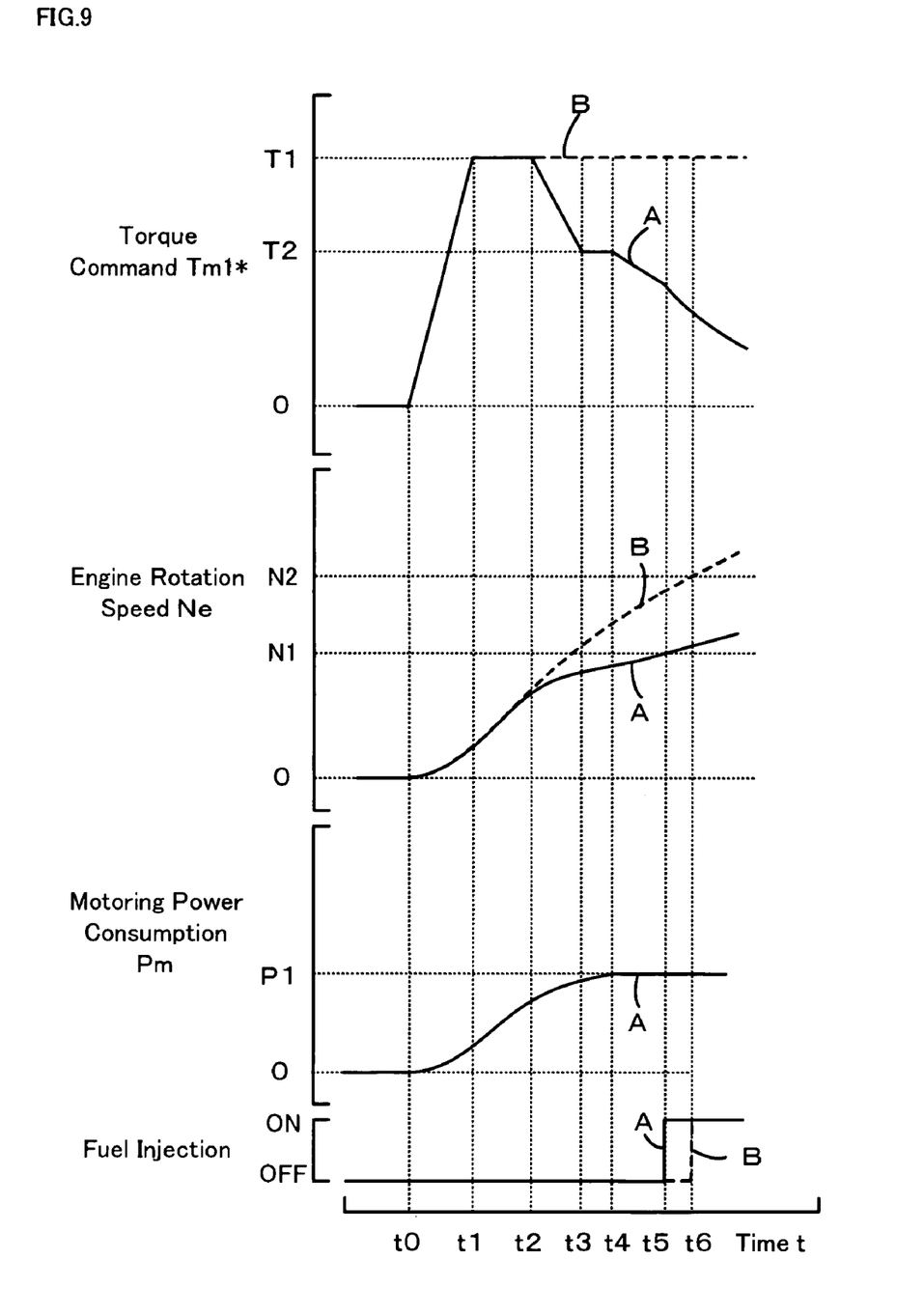
FIG. 9 is a graph showing time variations in torque command Tm1* of a motor MG1, rotation speed Ne of the engine, and motoring power consumption Pm and fuel injection and ignition timings at a start of the engine.

FIG. 9 is a graph showing time variations in torque command Tm1* of the motor MG1, rotation speed Ne of the engine 22, and motoring power consumption Pm and fuel injection and ignition timings at a start of the engine 22. Curves A of the solid line represent the time variations at a start of the engine 22 in the setting of the gearshift position SP to the D position. Curves B of the broken line represent the time variations at a start of the engine 22 in the setting of the gearshift position to the P position. In the gearshift position SP set to the D position, in response to a start request of the engine 22 at a time point t0, a relatively high torque T1 and a lower torque T2 than the torque T1 are sequentially set to the torque command Tm1* of the motor MG1 as shown by the solid line curve A. The output torque of the motor MG1 raises the rotation speed Ne of the engine 22. After a time point t4 when the motoring power consumption Pm reaches a preset reference power level P1, the torque command Tm1* of the motor MG1 is set to keep the motoring power consumption Pm at the preset reference power level P1. The rotation speed Ne of the engine 22 further rises with the output torque of the motor MG1 and reaches a relatively low rotation speed level N1 at a time point t5. Fuel injection and ignition of the engine 22 are initiated at the time point t5 to start the engine 22. This control procedure ensures a quick start of the engine 22, while desirably reducing the power consumption by motoring of the engine 22. In the gearshift position SP set to the P position, on the other hand, in response to a start request of the engine 22 at the time point t0, the relatively high torque T1 is set to the torque command Tm1* of the motor MG1 as shown by the broken line curve B. The output torque of the motor MG1 quickly raises the rotation speed Ne of the engine 22. At a time point t6 when the rotation speed Ne of the engine 22 reaches a higher rotation speed level N2 than the rotation speed level N1, fuel injection and ignition of the engine 22 are initiated to start the engine 22. This control procedure effectively reduces the potential vibrations at the start of the engine 22.

In response to a start request of the engine 22 in the setting of the gearshift position SP of the gearshift lever 81 to the D position, the hybrid vehicle 20 of the embodiment sets the relatively small value N1 to the threshold value Nref and starts fuel injection and ignition of the engine 22 when the engine 22 is motored to have the rotation speed Ne reach the threshold value Nref (=N1). This ensures a quick start of the engine 22. In response to a start request of the engine 22 in the setting of the gearshift position SP to the P position, on the other hand, the hybrid vehicle 20 sets the greater value N2 than the value N1 to the threshold value Nref and starts fuel injection and ignition of the engine 22 when the engine 22 is motored to have the rotation speed Ne reach the threshold value Nref (=N2). This effectively reduces potential vibrations at the start of the engine 22. The control operations of the embodiment thus ensure an adequate start of the engine 22 according to the gearshift position SP.

In the hybrid vehicle 20 of the embodiment, in response to a start request of the engine 22 in the setting of the gearshift position SP of the gearshift lever 81 to the D position, the output torque of the motor MG1 for motoring the engine 22 is sequentially controlled to the relatively high torque T1 until the time point t2 and to the lower torque T2 than the torque T1 after the time point t2. Accordingly the rotation speed Ne of the engine 22 increases at a relatively high rate until the time point t2 and further rises with the limited increase in motoring power consumption Pm after the time point t2. The output torque of the motor MG1 is controlled to motor the engine 22 with the motoring power consumption Pm in the range of not exceeding the preset reference power level P1. Such control reduces electric power consumed by motoring the engine 22 and thereby ensures an adequate supply of driving electric power to the motor MG2. In response to a start request of the engine 22 in the setting of the gearshift position SP to the P position, on the other hand, the engine 22 is motored with the relatively high torque T1 output from the motor MG1. Such control ensures a quick increase of the rotation speed Ne of the engine 22.

The embodiment regards the control operations of the hybrid vehicle 20 at a start of the engine 22 when the gearshift position SP is set to the D position or to the P position. When the gearshift position SP is set to the R position, the engine 22 starts according to the D-position motoring control process. When the gearshift position SP is set to the N position, the engine 22 starts according to the P-position motoring control process after activation of the parking lock mechanism (not shown) to fasten the ring gear shaft 32a or the drive shaft.

Figure 3:
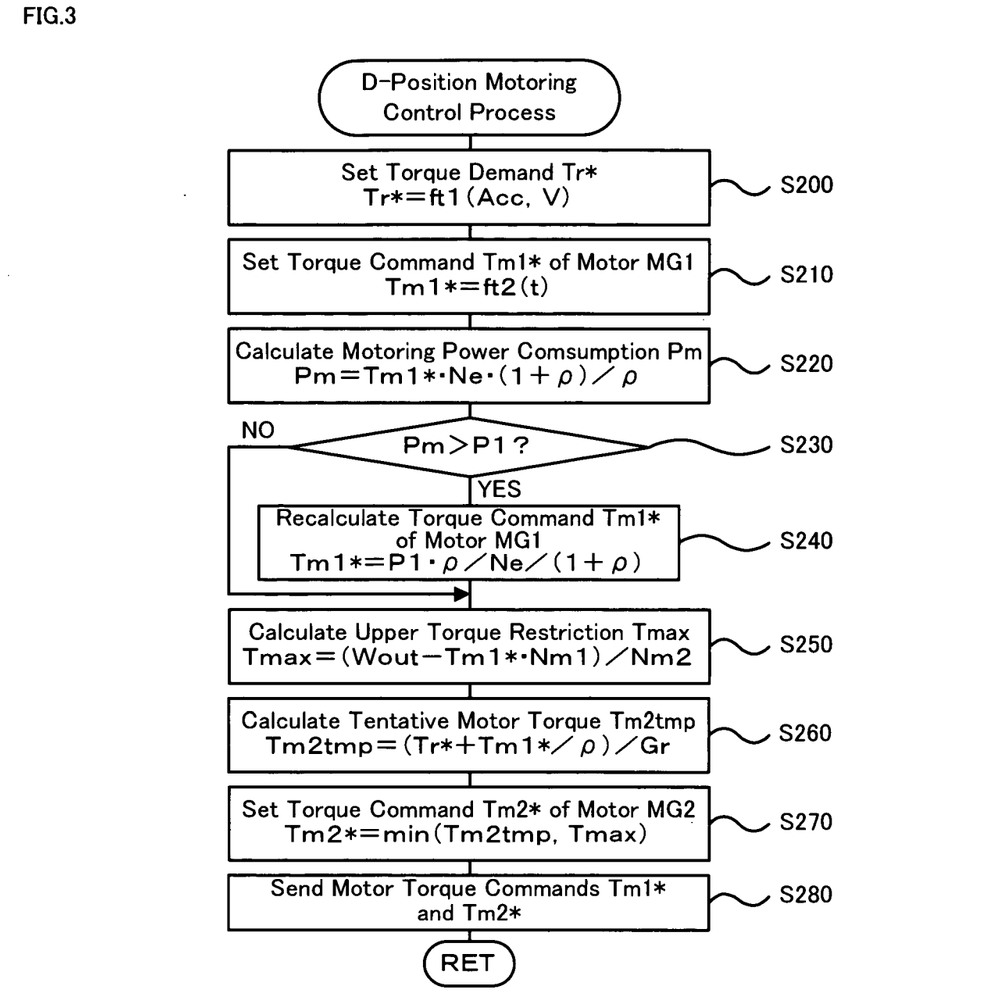
FIG. 3 is a flowchart showing the details of D-position motoring control executed at step S130 in the start control routine of FIG. 2.

In the D-position motor controlling process of FIG. 3 executed in the hybrid vehicle 20 of the embodiment, the motoring power consumption Pm is calculated from the torque command Tm1* of the motor MG1, the rotation speed Ne of the engine 22, and the gear ratio ρ of the power distribution integration mechanism 30. The motoring power consumption Pm may be calculated by another technique, for example, from electric power consumptions Pm1 and Pm2 by the motors MG1 and MG2 for motoring the engine 22. The electric power consumption Pm1 of the motor MG1 is computed from the torque command Tm1* and the rotation speed Nm1 of the motor MG1. The electric power consumption Pm2 of the motor MG2 is computed from the rotation speed Nr of the ring gear 32 and a canceling torque (Tm1*/ρ) that cancels out a reactive torque (−Tm1*/ρ)

applied to the ring gear shaft 32a by output of the torque command Tm1* from the motor MG1.

In the hybrid vehicle 20 of the embodiment, the D-position motoring control process sets the torque command Tm1* of the motor MG1 in the range of the motoring power consumption Pm that does not exceed the preset reference power level P1. The torque command Tm1* of the motor MG1 may alternatively be set, regardless of the motoring power consumption Pm. The P-position motoring control process sets the torque command Tm1* of the motor MG1, regardless of the motoring power consumption Pm. The torque command Tm1* of the motor MG1 may alternatively be set in the range of the motoring power consumption Pm that does not exceed a preset reference power level, for example, the preset reference power level P1.

In the hybrid vehicle 20 of the embodiment, at a start of the engine 22 in the setting of the gearshift position SP to the D position, the two different torque levels, that is, the relatively high torque T1 and the lower torque T2 than the torque T1 are sequentially set to the torque command Tm1* of the motor MG1 in the range of the motoring power consumption Pm that does not exceed the preset reference power level P1 as shown by the solid line curve A in FIG. 9. One possible modification may set one fixed torque level, for example, the torque T2, to the torque command Tm1* of the motor MG1 in the range of the motoring power consumption Pm that does not exceed the preset reference power level P1.

In the hybrid vehicle 20 of the embodiment, at a start of the engine 22 in the setting of the gearshift position SP to the P position, the relatively high torque T1 is set to the torque command Tm1* of the motor MG1 as shown by the broken line curve B in FIG. 9. The relatively high torque is not restricted to T1, but any suitable torque higher than the torque T2 may be set to the torque command Tm1* of the motor MG1.

In the hybrid vehicle 20 of the embodiment, until the time point t2 in FIG. 9, the solid line curve A of the torque command Tm1* of the motor MG1 at a start of the engine 22 in the setting of the gearshift position SP to the D position is identical with the broken line curve B of the torque command Tm1* of the motor MG1 at a start of the engine 22 in the setting of the gearshift position SP to the P position. The two torque curves A and B have different torques after the time point t2. In one possible modification, the two torque curves A and B may have an identical torque, for example, the torque T2, set to the torque command Tm1* of the motor MG1 even after the time point t2.

Figure 10:
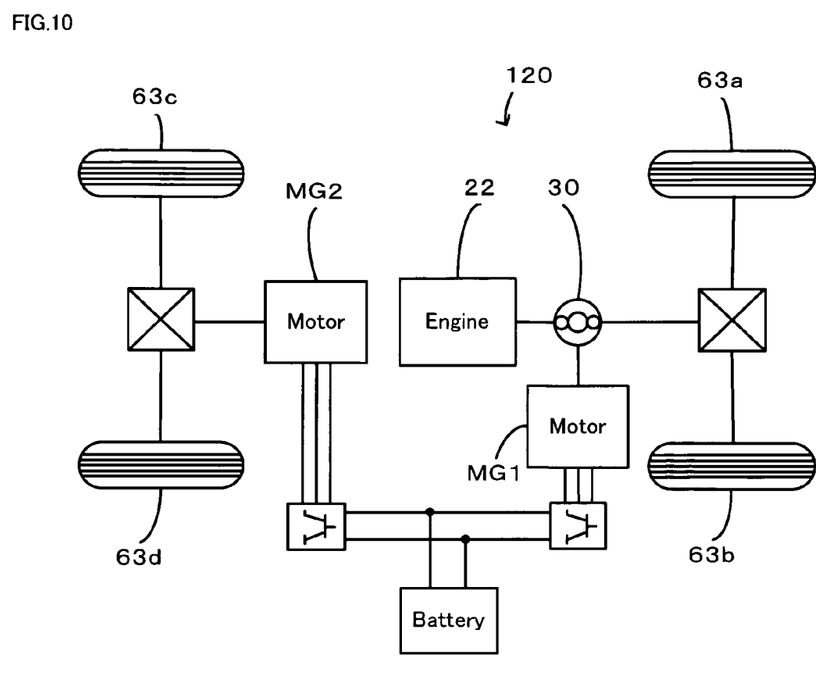
FIG. 10 schematically illustrates the configuration of another hybrid vehicle in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 10, the power of the motor MG2 may be output to another axle (that is, an axle linked with wheels 63c and 63d), which is different from an axle connected with the ring gear shaft 32a (that is, an axle linked with the wheels 63a and 63b).

Figure 11:
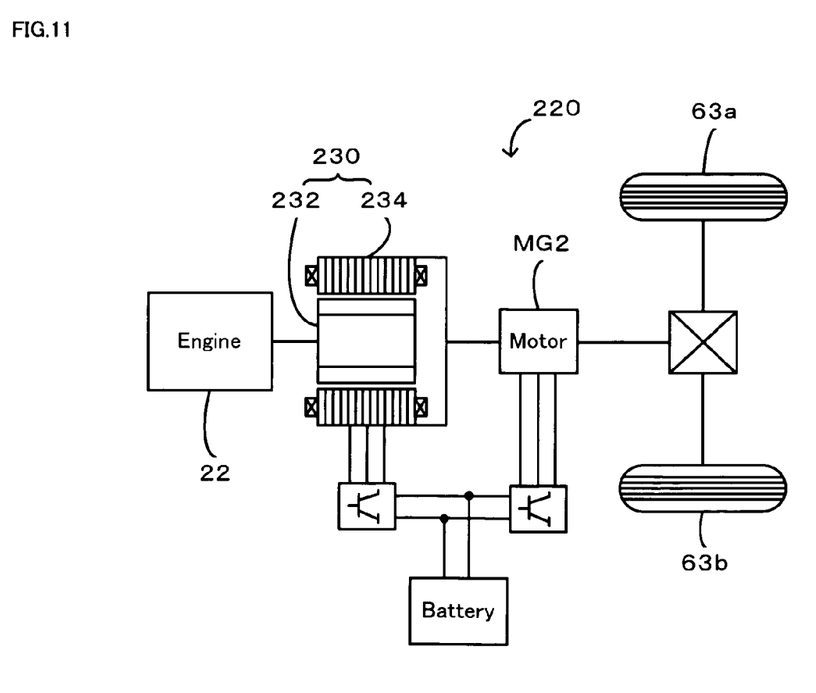
FIG. 11 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 11, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment regards the hybrid vehicle driven with the output powers of the engine and the motor. The technique of the invention is not restricted to the motor vehicles but is also applicable to any moving bodies driven with output powers of an engine and a motor, for example, railway vehicles, ships and boats, and aircraft.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2004-323959 filed Nov. 8, 2004 including specification, drawings and claims are incorporated herein by reference in its entirety.

What is claimed is:

1. A moving body, comprising:
   an internal combustion engine that outputs power used for moving said moving body;
   a motoring structure that motors the internal combustion engine;
   a motor that outputs power used for moving said moving body;
   an accumulator unit that transmits electric power to and from the motoring structure and the motor;
   a gearshift position detection unit that detects a gearshift position of a gearshift lever:
   a rotation speed measurement unit that measures a rotation speed of the internal combustion engine; and
   a start control module that, in response to a start request of the internal combustion engine in the detected gearshift position set to a moving position for moving said moving body, controls the motoring structure to motor the internal combustion engine and controls the internal combustion engine to start fuel injection and ignition of the internal combustion engine when the measured rotation speed of the internal combustion engine reaches a preset first rotation speed,
   in response to a start request of the internal combustion engine in the detected gearshift position other than the moving position, said start control module controlling the motoring structure to motor the internal combustion engine and controlling the internal combustion engine to start fuel injection and ignition of the internal combustion engine when the measured rotation speed of the internal combustion engine reaches a preset second rotation speed, which is higher than the preset first rotation speed.

2. A moving body in accordance with claim 1, wherein said start control module controls the motoring structure in the detected gearshift position set to the moving position to sequentially output a preset first torque before fulfillment of a predetermined condition and a preset second torque, which is lower than the preset first torque, after fulfillment of the predetermined condition, and
   said start control module controls the motoring structure in the detected gearshift position other than the moving position to output a preset third torque, which is higher than the preset second torque.

3. A moving body in accordance with claim 2, wherein the predetermined condition adopted by said start control module is elapse of a preset time since a start of motoring the internal combustion engine.

4. A moving body in accordance with claim 1, said moving body further comprising:
a motoring power consumption estimation module that estimates a motoring power consumption as electric power consumed by motoring the internal combustion engine,
wherein in response to the start request of the internal combustion engine in the detected gearshift position set to the moving position, said start control module controls the motoring structure to motor the internal combustion engine in a range of the estimated motoring power consumption that does not exceed a preset reference power level.

5. A moving body in accordance with claim 4, wherein said motoring power consumption estimation module estimates the motoring power consumption, based on the measured rotation speed of the internal combustion engine and an output torque of the motoring structure.

6. A moving body in accordance with claim 1, wherein the motoring structure comprises an electric power-mechanical power input output mechanism that is linked to an output shaft of the internal combustion engine and to a drive shaft driven for moving said moving body and outputs part of power, which is input from or output to the output shaft of the internal combustion engine, to the drive shaft through input and output of mechanical power and electric power,
the motoring structure motors the internal combustion engine with output of a canceling power to cancel out the output power to the drive shaft by the electric power-mechanical power input output mechanism.

7. A moving body in accordance with claim 6, wherein the motor is connected to output power to the drive shaft, and
the motoring structure motors the internal combustion engine with output of the canceling power from the motor.

8. A moving body in accordance with claim 6, wherein the electric power-mechanical power input output mechanism comprises:
a three shaft-type power input output module that is linked to three shafts, the output shaft of the internal combustion engine, the drive shaft, and a third rotating shaft, and inputs and outputs power from and to a residual one shaft, based on powers input from and output to any two shafts among the three shafts; and
a motor for the rotating shaft that is capable of inputting and outputting power from and to the third rotating shaft.

9. A moving body in accordance with claim 6, wherein the electric power-mechanical power input output mechanism comprises:
a pair-rotor motor that has a first rotor connected to the output shaft of the internal combustion engine and a second rotor connected to the drive shaft and outputs at least part of the power from the internal combustion engine to the drive shaft with input and output of electric power through electromagnetic interactions of the first rotor and the second rotor.

10. A control method of a moving body, said moving body comprising: an internal combustion engine that outputs power used for moving said moving body; a motoring structure that motors the internal combustion engine; a motor that outputs power used for moving said moving body; and an accumulator unit that transmits electric power to and from the motoring structure and the motor,
said control method comprising the steps of:
(a) in response to a start request of the internal combustion engine in a detected gearshift position of a gearshift lever set to a moving position for moving said moving body, controlling the motoring structure to motor the internal combustion engine and controlling the internal combustion engine to start fuel injection and ignition of the internal combustion engine when an observed rotation speed of the internal combustion engine reaches a preset first rotation speed; and
(b) in response to a start request of the internal combustion engine in the detected gearshift position other than the moving position, controlling the motoring structure to motor the internal combustion engine and controlling the internal combustion engine to start fuel injection and ignition of the internal combustion engine when the observed rotation speed of the internal combustion engine reaches a preset second rotation speed, which is higher than the preset first rotation speed.

11. A control method in accordance with claim 10, wherein said step (a) controls the motoring structure to motor the internal combustion engine with a preset first torque before fulfillment of a predetermined condition and with a preset second torque, which is lower than the preset first torque, after fulfillment of the predetermined condition, and
said step (b) controls the motoring structure to motor the internal combustion engine with a preset third torque, which is higher than the preset second torque.

* * * * *